United States Patent [19]

Arendt

[11] 4,255,456
[45] Mar. 10, 1981

[54] ROASTED GROUND WHEAT COATING

[75] Inventor: Phillip S. Arendt, Chaska, Minn.

[73] Assignee: Peavey Company, Minneapolis, Minn.

[21] Appl. No.: 962,914

[22] Filed: Nov. 22, 1978

[51] Int. Cl.$^3$ ............................................. A21D 15/08
[52] U.S. Cl. ..................................... 426/64; 426/626; 426/302
[58] Field of Search ................ 426/64, 436, 466, 473, 426/601, 618, 622, 626, 650, 651, 302; 429/99

[56] References Cited

U.S. PATENT DOCUMENTS

| | | | |
|---|---|---|---|
| 3,240,606 | 3/1966 | Bond | 426/618 |
| 3,586,512 | 6/1971 | Mancuso et al. | 426/618 |

*Primary Examiner*—Joseph M. Golian
*Assistant Examiner*—Elizabeth A. Hatcher
*Attorney, Agent, or Firm*—Orrin M. Haugen; Thomas J. Nikolai

[57] ABSTRACT

A coating for simulating the taste of toasted, baked, and leavened food products such as bread or the like, and the method of preparing such a coating. The coating is applied to an untoasted, baked and leavened food product, particularly on the outer surface thereof in order to simulate toasting. The coating in addition to providing a simulated taste of a toasted product, further provides a sealant to resist or retard the penetration of moisture, grease, or condiments into the interior portions. The coating contains roasted ground wheat, and preferably includes a quantity of roasted ground wheat which, in the whole grain form, has been soaked in an aqueous solution of a food grade acid selected from the group consisting of phosphoric, adipic, hydrochloric, citric and malic acids and mixtures thereof. The soaked grain is roasted at temperatures of between about 150° F.–510° F. for a period sufficient to reduce the moisture content to 4% or less. The roasted ground wheat product is then mixed with a carrier of hydrogenated vegetable oil having a melting point greater than about 100° F. to form a coherent fluid mass. This coherent fluid mass may be further treated with flavoring materials, as desired, and the substance may then be applied to the baked and leavened food product by brushing, spraying, or other suitable means.

3 Claims, No Drawings

ROASTED GROUND WHEAT COATING

BACKGROUND OF THE INVENTION

The present invention relates generally to an improved food flavoring substance, and more specifically to a coating for baked and leavened food products such as hamburger buns or the like, and wherein the coating simulates in both taste and appearance, a toasted product. The coating eliminates the toasting process normally undertaken by food preparation establishments, with this step being replaced by applying the coating of the present invention. The preparation has primary application to fast-food establishments, in particular those fast-food establishments dispensing hamburgers or other products in conventional buns.

Fast-food establishments typically utilize a baked and leavened bread product in the form of a bun to receive a fried or broiled hamburger or other food component. In order to add flavoring to the product, condiments are frequently applied, such as mustard, ketchup, or the like. In order to provide a sealing film to the bun, the fast-food establishments have normally placed the bun on the surface of a hot plate maintained at a temperature of about 400° F., with contact being maintained for approximately one minute. This treatment requires the availability of a hot surface, which is maintained only through the expenditure of substantial quantities of energy.

The coating of the present invention simulates the taste and appearance of a toasted bun surface. This coating eliminates the need for the toasting process, and in turn, substitutes the application of the coating to the surface normally toasted. It has been found that the coating provides improved sealing properties to the surface of the bun, and hence retards the influx or penetration of moisture, grease, or condiment components into the interior portions. This provides a finished product which is significantly less soggy than would otherwise be the case if the coating or toasting operations were omitted or deleted. In order to provide desired flavors, spices or vitamins may be added as desired or indicated.

Essentially, the coating of the present invention contains a quantity of roasted ground wheat. Specifically, cleaned whole wheat is tempered in water by soaking in a mild aqueous solution of a food grade acid such as citric or malic acid until the moisture content of the wheat is substantially increased. The tempered kernels are then toasted or roasted until a dark roast-like appearance or color is reached, at which time the toasted product is milled into a fine particulate brown-colored powder. In addition, a second quantity of whole grain product, such as whole grain wheat or barley, is provided which is malted and then ground and added to the other ground material. The ground components are then added to a blend of oil, preferably a partially hydrogenated vegetable oil such as soy or cottonseed oil and thoroughly mixed until a coherent fluid mass is obtained. The hydrogenated vegetable oil preferably has a melting point of greater than about 103° F. for best results. Dispersion and suspension aids in the form of fumed silicon dioxide flour may be added if desired in order to stabilize the coherent mass.

SUMMARY OF THE INVENTION

Therefore, it is a primary object of the present invention to provide an improved coating material for baked and leavened food products such as hamburger buns or the like, wherein the coating simulates the taste and appearance of a toasted product, and wherein the coating seals the surface of the product so as to retard the rate at which moisture, grease and/or condiments penetrate into the interior portions of the baked and leavened food product.

It is yet a further object of the present invention to provide an improved coating for hamburger buns or the like wherein the coating simulates the taste and appearance of a bun which has been toasted, with the coating containing as a coloring portion, toasted, tempered and ground wheat, along with malted wheat, and wherein the coating provides a seal for retarding the rate at which moisture, grease, and/or condiments penetrate the surface of the bun.

Other and further objects of the present invention will become apparent to those skilled in the art upon a study of the following specification and appended claims.

DESCRIPTION OF THE PREFERRED EMBODIMENT

In order to disclose the various concepts of the present invention, the following formulation is provided:

TABLE I

A coating for conventional hamburger buns was prepared having the following formulation:

| Component | Percentage |
| --- | --- |
| Partially hydrogenated vegetable oil (melting point 103° F. (39.5° C.)) | 62.53 |
| Roasted ground wheat (prepared as Component A described below) | 17.96 |
| Ground malted wheat | 8.64 |
| Confectioner's sugar | 8.00 |
| Powdered silicon dioxide | .90 |
| Lecithin | .17 |
| Carboxymethylcellulose | .90 |
| Oleoresin paprika | .09 |
| Silicon dioxide | .01 |
| Hydrolyzed vegetable protein | .60 |
| Yeast | .20 |

COMPONENT A

Cleaned whole grain wheat is tempered in water by soaking in a mildly acidic aqueous solution (pH 3.5–4) in citric acid until the moisture content of the wheat has reached 30% to 33%. The tempered wheat is then roasted at 430° F. until a dark toast-like appearance is reached. The roasted wheat is then milled into a fine brown-colored powder of 100 mesh size or finer, with this ground powder comprising the major coloring portion of the coating substance.

MALTED WHEAT

Cleaned whole grain wheat is tempered in cold water (40° F.) by soaking 30 to 48 hours. The wheat is drained and allowed to sprout or malt for 42 to 96 hours by drum rotation. The sprouted wheat is then dried and roasted at 250° F. until the moisture content is reduced to 4% or less. The sprouts are then removed by mechanical means. The cleaned malted wheat is then ground into a fine powder of 100 mesh size or less, with this malted wheat comprising the principal flavoring component of the coating. In the malting operation, the sprouts are permitted to grow until they are substantially equal to grain size.

HYDROGENATED VEGETABLE OIL

Hydrogenated soy and/or cottonseed oil is used as a carrier for the roasted and malted wheat components. The blend used in this example is commercially available from Swift & Company under the mark "TEM-WIP" which has a melting point of 103° F. (39.5° C.) and a solid fat indice as follows:

50° F.—63
70° F.—50
80° F.—42
92° F.—17
100° F.—3

It will be appreciated that hydrogenated vegetable oil is preferred, however animal oils such as beef tallow or hydrogenated beef tallow may be suitably employed. The same constraints on melting points are appropriate, with the beef tallow, preferably hydrogenated, having a melting point of between 100°–110° F. As a further substitution for the hydrogenated vegetable oil, other oils, such as oils derived from fish may be employed.

In a specific example, the partially hydrogenated vegetable oil of Table I is replaced with hydrogenated beef tallow having a melting point of approximately 103° F. on a 1:1 basis.

An alternate formulation may be pepared as in Table II as follows:

TABLE II

| Component | Percentage |
| --- | --- |
| Partially hydrogenated vegetable oil (melting point 103° F. (39.5° C.)) | 57.23 |
| Lecithin | .17 |
| Roasted ground wheat (prepared as Component A hereinabove) | 19.96 |
| Ground malted wheat | 6.64 |
| Confectioner's sugar | 14.00 |
| Powdered silicon dioxide | 1.00 |
| Carboxymethylcellulose | .90 |
| Oleoresin paprika | .09 |
| Silicon dioxide | .01 |

The wheat components are prepared in the same fashion as indicated hereinabove in connection with Table I, excepting that malic acid is used in lieu of citric acid.

GENERAL DISCUSSION

In order to obtain a suitable material for coating buns, the following workable range has been determined for the individual components of the formulation:

| Component | Percentage |
| --- | --- |
| Partially hydrogenated vegetable oil (melting point 103° F. (39.5° C.)) | 45%–95% |
| Lecithin | 0%–.5% |
| Roasted ground wheat | 5%–60% |
| Ground malted wheat | ⅛ to ½ of the toasted ground wheat (A) present. |
| Confectioner's sugar | 5%–20% |
| Powdered silicon dioxide | 0%–1% |
| Carboxymethylcellulose | 0%–1% |
| Oleoresin paprika | 0%–.2% |

With this range, a workable and useful bun coating may be formulated.

PARTIALLY HYDROGENATED VEGETABLE OIL

Soy and/or cottonseed oils may be used as the carrier for the wheat components. The system works well with either, with the material being essentially a vehicle or carrier, preferably low in fat content and high in colorant. The availability of such a material reduces the tendency of the baked and leavened food product to absorb condiments or other moisture-carrying components. The texture is actually preferred over that obtained by toasting, with toasting reducing the desirable soft characteristics of the textured product.

The shortening component such as the hydrogenated vegetable oil provides a resistant coating which will reduce the tendency for absorption of fluids, and will provide, when containing the roasted and malted wheat, an appearance or customer appeal.

The hydrogenated vegetable oil should return to solid form relatively quickly, and remain generally solid at room temperature. The melting point range is preferably between about 103°–117° F., with this being the range desired since when higher melting point ranges are employed, the material becomes "waxy" in texture. Lower melting point ranges, that is below about 100° F., provide an undesirably thin, low viscosity material.

LECITHIN

Lecithin is employed in the formulation for use as a slip agent or lubricant for normal processing operations. The lecithin further functions as a release agent. Lecithin is, of course, commercially available.

ROASTED WHOLE GRAIN WHEAT

As has been indicated, the roasted whole grain wheat, milled to a size of 100 mesh or finer, comprises and forms the major coloring portion of the overall coating.

In the examples, the whole grain wheat was tempered in a solution of citric acid (Table I) and malic acid (Table II). It has been determined that any food grade acidulent may be employed, with the acidulents being selected from the group consisting of phosphoric, adipic, hydrochloric, citric and malic acids, as well as mixtures thereof. The pH of the aqueous acidic solution is preferably between 3.5 and 4, with the acidic solution restraining sprouting of the tempered wheat. Furthermore, some flavor is provided since the acid hydrolyzes certain enzymes present in the mix. Normally, in order to achieve a moisture content in the wheat of between 30% and 33%, two to three hours of soaking is required at room temperature. In addition to the flavor enhancement, the utilization of the acidic aqueous solution tends to sequester heavy metals which may be present, and furthermore reduce the microbiological profile of the material. The tempering in water further controls hydrolysis of the alleuron layer.

MALTED WHEAT

Malted wheat is commercially available, and may be obtained from any commercial source. However, in the table above, specifically Table I, a technique for preparing the malted wheat prior to grinding is provided. In this connection, the malted wheat provides a flavoring component, with malting being utilized to encourage or enhance the growth of enzymes. In order to terminate the malting, the malted product is heated at a low temperature, specifically about from 150° F.–300° F. to prepare the product for subsequent grinding. Vacuum flash technology may also be employed. The temperature is held at a lower level in order to avoid any tendency to caramelize the sugar components which, if permitted to occur, would destroy the flavors of the material.

In the grinding of the malted wheat product as well as the tempered wheat product, air classification milling is normally used to achieve a greater degree of uniformity. It is preferred that the milled product have a particle size of 100 mesh or smaller, although particle sizes as large as 70 mesh may be used. Typically, for best results, 100% of the product should be ground to at least 100 mesh, with 90% being in the 200 mesh size. As an outside limit, however, if 80% of the product is less than 70 mesh, and reasonably uniformly ground, it could be found useful. The grinding is deemed important to achieve uniform coloring and a lack of tendency toward speckling.

In one alternate application, malted barley may be employed as a substitute for malted wheat, with malted barley being available commercially as malted barley flour. Specifically, in one alternate formulation, malted barley was substituted on a 1:1 basis for the malted wheat, with the remaining components in the formulation being the same as those set forth in Table I herein.

CONFECTIONER'S SUGAR

This component provides a flavoring and sweeting for the product, and, as indicated, is present in a range of from 5% to 20%.

SILICON DIOXIDE FLOUR

Silicon dioxide flour is available commercially, with one such material being available and widely used under the mark "CAB-O-SIL M-5", available from the Cabot Corporation of Boston, Massachusetts.

CARBOXYMETHYLCELLULOSE

Carboxymethylcellulose is employed as a stabilizer for the overall formulation. Carboxymethylcellulose is available commercially under the name "AVICEL 591" from FMC Corporation of Philadelphia, Pa. Specifically, the carboxymethylcellulose which is employed in the formulation is crystalline cellulose having a molecular weight of between 30,000 and 50,000, and with a particle size of between about 10 and 50 microns. The material has a density of 1.55, with a bulk density ranging from between about 0.3–0.8. The material is utilized to form a stable formulation, and is low in caloric content.

OLEORESIN PAPRIKA

Oleoresin paprika is utilized as a flavoring component, and furthermore provides a reddish hue to more closely simulate toasting. The oleoresin paprika utilized in Tables I and II is of 80,000 color units.

HYDROLYZED VEGETABLE PROTEIN

Hydrolyzed vegetable protein is utilized to enhance the coloring of the solution, with this material being suitable for use as a substitute for the tempered whole grain wheat in certain formulations. Hydrolyzed vegetable protein is also utilized to enhance the flavor of the overall product, and is commercially available under the code name "VEGAMINE 69" from Griffith Laboratories of Alsip, Ill.

YEAST

Yeast is added for its flavoring, and any commercial grade of torutein yeast may be suitably employed.

PREPARATION OF FORMULATION

In order to process the formulations of Tables I and II, oleoresin paprika is dry mixed with a carboxymethylcellulose until uniform. The confectioner's sugar is then added, along with the roasted wheat and roasted malted wheat components. Fumed silicon dioxide is then added to the dry mix. The shortening is then heated to a point slightly above its melting temperature, 103°–110° F., with lecithin being added to the melted shortening and mechanically dispersed. The dry mix ingredients are then slowly added to the heated and fused shortening with strong mechanical agitation. The entire mixture is then homogenized through a conventional mechanical homogenizer and ultimately poured into trays or molds and allowed to harden.

ADVANTAGES OF THE PRESENT COATING

The present coating provides significant advantages in the reduction of energy consumption which is otherwise required for the conventional toasting of buns or baked and leavened food products. The arrangement further reduces the apparatus needed and the maintenance which would otherwise be required. The time required for preparing the product is further reduced and it has been found that the ultimate product is prepared more quickly, such as in a fast-food operation, where a hamburger is being prepared. This material permits the bun to be treated more quickly than that required for conventional toasting.

I claim:

1. The method of preparing a coating for baked and leavened food products which comprises the steps of:
    (a) selecting a portion of whole grain product which consists essentially of a malted whole grain product selected from the group consisting of malted wheat and malted barley, wherein the whole grain product has been ground to a particle size of less than about 70 mesh;
    (b) soaking a second portion of whole grain wheat in an aqueous solution of a food grade acid to increase the water content to between about 30% and 33%, and roasting said soaked whole grain wheat so as to reduce the water content to less than about 4% to form a treated wheat product, and thereafter grinding said dried wheat portion to a particle size of less than about 70 mesh; and
    (c) mixing said first and second ground wheat portions with a carrier of an edible oil selected from the group consisting of vegetable oils of soy and cottonseed origin and hydrogenated beef tallow and mixtures thereof, with said edible oil having a melting point of between about 100° F. and 117° F. to form a coherent fluid mass.

2. The method of preparing a coating for baked and leavened food products which comprise the steps of:
    (a) increasing the water content of a first portion of whole grain wheat to between about 30% and 33% by soaking in an aqueous solution of a food grade acid selected from the group consisting of phosphoric, adipic, hydrochloric, citric and malic acids, and mixtures thereof, roasting said soaked whole grain wheat at a temperature of between about 150° F.–510° F. for a period sufficient to reduce the moisture content to less than about 4% to form a treated wheat product, and thereafter grinding said treated wheat product to a particle size of less than about 70 mesh;

(b) selecting a second portion of whole grain product which consists essentially of a malted whole grain product selected from the group consisting of malted wheat and malted barley ground to a particle size of less than about 70 mesh;

(c) mixing said first and second ground wheat portions with a carrier of an edible oil, with said edible oil having a melting point of between about 100° F. and 117° F. to form a coherent fluid mass.

3. The method as defined in claim 2 wherein said edible oil is selected from the group consisting of vegetable oils of soy and cottonseed origin and hydrogenated beef tallow.

* * * * *